United States Patent [19]

Stewart et al.

[11] Patent Number: 4,638,384
[45] Date of Patent: Jan. 20, 1987

[54] HEAD POSITIONING MECHANISM FOR ROTATING DISK DATA STORAGE SYSTEM

[75] Inventors: Alexander Stewart; Duncan S. Furness; Sham P. Bhatia, all of Boca Raton, Fla.

[73] Assignee: Rodime, PLC, Scotland

[21] Appl. No.: 799,595

[22] Filed: Nov. 19, 1985

[51] Int. Cl.[4] .............................................. G11B 5/56
[52] U.S. Cl. ...................................................... 360/77
[58] Field of Search ......................................... 360/77

[56] References Cited

U.S. PATENT DOCUMENTS

| Re. 32,075 | 1/1986 | Harrison et al. | 360/77 |
| 4,396,959 | 8/1983 | Harrison et al. | 360/77 |

FOREIGN PATENT DOCUMENTS

| 0094314 | 11/1983 | European Pat. Off. | 360/77 |
| 54-125010 | 9/1979 | Japan | 360/77 |

OTHER PUBLICATIONS

IBM Technical Disclosure Bulletin, vol. 5, No. 1, Jun. 1962, p. 33, Magnetic Head Positioning, W. Baslik.
IBM Technical Disclosure Bulletin, vol. 15, No. 3, Aug. 1972, pp. 752-753, Discrete Magnetic Recording System, L. Shew.

Primary Examiner—George G. Stellar
Attorney, Agent, or Firm—Dickstein, Shapiro & Morin

[57] ABSTRACT

A fine position closed loop servo system is disclosed for magnetic disk storage media having a plurality of data storage disks in which a first servo burst is contained on the surface of one of the data storage disks, the servo burst data being spaced at radial positions one-half track displaced from each of the odd-numbered concentric track centerlines and a second servo burst signal is contained on the surface of another of the data storage disks, the second servo burst signal being recorded at radial positions one-half track displaced from the even-numbered concentric track centerlines. Both the first and second servo burst data are read simultaneously utilizing the data transducers associated with the surfaces of the respective data storage disks and the envelopes of each of the servo burst signals are simultaneously, separately detected. The envelope signals thus detected are compared in order to generate a position error signal which is applied to the head actuating mechanism of the disk drive in order to promote and maintain track centerline alignment of an enabled data transducer during operation of the magnetic disk storage means.

20 Claims, 7 Drawing Figures

HEAD POSITIONING MECHANISM FOR ROTATING DISK DATA STORAGE SYSTEM

CROSS-REFERENCE TO RELATED APPLICATIONS

The assignee of the instant application is also the assignee of an application filed Feb. 22, 1984, entitled, "MICRO HARD-DISC DRIVE SYSTEM," U.S. patent application Ser. No. 582,554, now U.S. Pat. No. 4,568,988, and an application filed Sept. 6, 1985, entitled, "HIGH CAPACITY DISK DRIVE," U.S. patent application Ser. No. 773,136. The disclosure of both of those applications is incorporated by reference herein.

BACKGROUND OF THE INVENTION

The present invention relates generally to position control systems used in connection with rotating disk data storage systems. More particularly, the present invention relates to a method of and system for moving a memory data device member, such as a read/write head, relative to a desired concentric track of the rotating data disk storage media, and keeping the moved head in the desired alignment with the chosen concentric track.

Disk drives normally employ coarse positioning subsystems for moving heads to the proximity of addressed tracks on recording surfaces and fine positioning subsystems for moving those heads into final alignment with the addressed tracks. Two basic categories of head positioning servo systems are known, open loop systems and closed loop systems. In an open loop head positioning system, both the coarse and fine positioning are controlled by indexing mechanisms that are mechanically or electrically coupled to the carriage assembly for the heads.

While such approaches tend to be of low cost, the disadvantage of all open loop systems is that such systems actually position the carriage assembly and heads with reference to a stationary part of the disk drive, but not with reference to recorded data on the recording surfaces. If any tendency exists for mechanical drift or movement in any part of the mechanism involved in the positioner or disk system, which can easily occur due to thermal expansion or physical abuse during shipment, installation or use of the disk drive, the indexing mechanism can position the carriage assembly exactly where it is supposed to be but the heads will remain offset from the center of the data tracks recorded prior to that mechanical movement or drift.

Even if the heads are located exactly as designed relative to the indexing mechanism, such a system requires that the data tracks be spaced far enough apart to take into account all of the variations of the system, including mechanical tolerances in the stepping motor actuator, thermal expansion of the disk, and disk runout. Thus, open loop head positioning servo systems are satisfactory only for disk drives in which the number of tracks per inch (track density) is low. That results in a disk drive product which, while effective as a low cost unit, lacks the data storage capacity of the more expensive units with the result that the cost of storage per bit stored of a low cost drive approaches the same cost as the earlier, and more expensive, dedicated servo system storage unit.

The heads of disk drives which read or write at higher track densities are generally positioned with reference to the information written on the recording surfaces of the disks, rather than with reference to a stationary support on the disk drive. Such systems are referred to as closed loop systems.

In one such implementation of a closed loop system, which utilizes a generally higher cost approach, one surface of a disk is dedicated to tracks of pre-recorded servo information. A read-only transducer or servo head is used to detect the prerecorded servo information on a selected servo track in order to provide signals which are processed by logic circuits. Since all of the other heads of the disk pack, including the servo head, are contained in a mechanically ganged head assembly, they follow the movement of the servo head as it tracks the selected servo track.

A disadvantage of that type of closed loop system is that the servo head and the data heads may not be aligned with one another due to manufacturing process tolerances or abuse of the head assembly. Thus, even though the centerline of the servo track in a selected cylinder may be followed by the servo head, the data heads may be permanently offset by differing amounts from the centerlines of the data tracks in the same cylinder.

In another type of closed loop head positioning servo system, which is known as a single surface system, the servo information is recorded on the same surface on which data is to be recorded. In such systems, the servo information is recorded in a number of servo tracks separated from one another by one or more data tracks. A single head can thus be used to read both data and servo information in a single channel, that channel consisting of a data track and two parallel servo tracks on opposite edges of the data band.

Such servo tracks generally comprise two halves, the two halves of the servo track being capable of discrimination during readback by virtue of predetermined frequency or timing relationships. The data head can thus be centered exactly on the servo track by obtaining an equal amplitude output from both halves of the track. By positioning the actuator exactly on the center of the inner and outer servo tracks in turn, that information may be used to calibrate a secondary transducer, such as a stepper motor used in the micro-step mode or an optical transducer. That approach has the disadvantage that it is necessary to move the heads away from the data band to perform the recalibration, causing an interruption in data transfer. Also, the correction factor for each track in the data band must be predicted from an algorithm which is of limited accuracy.

A variation of the single surface system described above utilizes pre-recorded servo information on each track used for data on a limited number of radial sectors on the disk surface. Data is written on the sectors of the disk surface between those servo sectors. A single transducer may thus be used to read and write data and also to detect the pre-recorded servo information as the transducer passes over a servo sector.

Such single surface systems have disadvantages, relative to the dedicated servo system described earlier, in that they are subject to catastrophic write failures. For example, if a head erroneously erases data from the recording surface, the servo information on the surface can be obliterated. That results in a partial or even total loss of servo capability. The dedicated servo system, on the other hand, is not subject to such catastrophic write failure since its servo head is a read-only transducer.

Other disadvantages of a single surface system are the reduction of the data storage capacity of the surface, since a significant portion of the data surface is normally dedicated to the recording of servo information and causes total inflexibility in the length and number of sectors recorded on the disk surface since the servo data is factory pre-recorded and data must fit between the servo bursts. On the other hand, if a sufficient number of servo bursts are written per track, then the servo system can be designed to follow eccentricities in each track, making the system suitable for very high track density applications.

Another approach used by the prior art is that shown in U.S. Pat. No. 4,396,959 to Harrison et al. The device shown therein utilizes a position transducer which provides a poly-phase signal which is generated in response to the actual sensed present position of the head support structure relative to the frame to which the head support structure is rotatably mounted. That structure serves as the coarse head positioning servo transducer.

A fine position closed loop servo is also provided which is connected to the driver of the head assembly and is operated from pre-recorded information in a single, data masked servo sector on a data surface of the rotating disk. That data is read by a head supported by the moveable member or head support structure.

As disclosed in Harrison et al, a single-disk surface on one of the many disks utilized for storage in the disk drive contains a single 200 byte wide servo data sector which utilizes two similar bursts B1 and B2. Each odd-numbered track has a burst of data B1 spaced radially away from the track and centered on an imaginary centerline between the track and the adjoining lower-numbered track. The second data burst B2 is likewise spaced about an imaginary line midway between the centerline of each even numbered track and the next lower numbered track. Each of the data bursts are displaced in time from each other.

The Harrison et al device utilizes only one head in order to provide fine correction for the entire disk stack head assembly. As the head passes over the first burst B1, it is read and its peak is detected and integrated in order to produce an amplitude signal. Shortly thereafter, the second data burst is read by the same head and is likewise peak-detected and integrated to produce a signal representative of its amplitude. Those amplitudes are then individually sampled and held separately for comparison. The resulting signal is then converted to a digital signal for use by the microprocessor servo controller.

The system disclosed by Harrison et al has the same disadvantages as the single surface systems described above, namely that it is subject to a catastrophic write failure in the event that the single head reading the only recording surface containing the servo information either erroneously erases data from that recording surface or that recording surface is otherwise damaged during shipment or by other abuse.

Another disadvantage of the Harrison et al device is that it is not sufficiently accurate and reliable enough when used for the positioning of transducers with high capacity disk drives having, for example, more than six hundred concentric tracks per inch.

With the introduction of both the mini or 5¼ inch Winchester disk drive systems and the micro or 3 and ½ inch Winchester disk drive systems, and the accompanying data storage which has been achieved by the instant assignee, the correct positioning of the read/-write transducer over a centerline of the addressed track has become even more critial.

Among the various advances that have been made in the construction and operation of disk drive systems are those developments made by the assignee of the present invention, RODIME PLC, which developments are set forth in the following United States Patent and patent applications. The subject matter of such patent and patent applications is hereby incorporated by reference.

U.S. Pat. No. 4,392,095, entitled, "METHOD OF AND APPARATUS FOR GENERATING A UNIQUE INDEX MARK FROM THE COMMUTATION SIGNAL OF A D.C. BRUSHLESS MOTOR," discloses a system for providing a unique index mark relative to the computer disk which is required for avoiding errors in addressing a memory location on the disk surface. That index mark is provided by correlating the commutation signal from a d.c. motor with a synchronizing signal present on one or more discrete tracks of the computer disk.

U.S. patent application Ser. No. 332,003, entitled "READ/WRITE HEAD THERMAL COMPENSATION SYSTEM," now abandoned discloses a thermal compensation system used by RODIME PLC in its 5 and ¼ inch disk drive system. That thermal compensation system uses different materials with different coefficients of thermal expansion for various components of the positioning mechanism for the read/write head used in the disk drive system.

U.S. Pat. No. 4,538,192, entitled "VENTILATION SYSTEM FOR A COMPUTER DISK DRIVE HUB ASSEMBLY," discloses a ventilation system for use in a computer disk drive which enables the disk file data storage capacity to be increased for a given volume of chamber housing the disk and improves the disk drive operating performance.

U.S. Pat. No. 4,489,259, entitled "METHOD AND APPARATUS FOR CONTROLLING A STEPPER MOTOR," discloses a system for minimizing oscillations of the stepper motor for a single step, minimizing the time taken for the stepper motor to move between tracks for multi-track seek operations and reducing the angular hysteresis due to the mechanical and magnetic properties of the stepper motor construction. In controlling the operation of the stepper motor, a microprocessor circuit is adapted to drive the stepper motor in accordance with predetermined programs.

U.S. Pat. No. 4,568,988, entitled "MICRO-HARD DISK DRIVE SYSTEM," discloses a high-density micro-Winchester hard disk system using a hard disk of approximately three and one-half inches and having digital information stored at a density of approximately 600 concentric tracks per inch. A stepper motor is designed to increment in steps of 0.9° which causes the read/write head to move from one track to the next adjacent track on the hard disk. For many applications, it has now become advantageous to utilize a high performance three and one-half inch Winchester disk drive having a storage capacity in excess of that achieved in the above-disclosed micro hard disk drive system, namely in excess of 10 Megabytes. Such increased storage capacity allows the use of more sophisticated programs and the storage of data for use therewith than has been possible heretofore.

SUMMARY AND OBJECTS OF THE INVENTION

In view of the foregoing, it should be apparent that there still exists a need in the art for an accurate and reliable positioning mechanism for positioning a data transducer relative to a plurality of rotating data storage media. It is, therefore, a primary object of this invention to provide such a data transducer positioning mechanism for use with a high capacity disk drive system which has particular application for use with both mini and micro-Winchester disk drives.

A further object of the present invention is to provide a low cost closed loop servo control system which improves the accuracy of maintaining a transducer in alignment with the centerline of a data track during read and/or write operations of a disk with high data track densities.

Still another object of the present invention is to provide recorded data for use in the fine positioning of a transducer stack for a high capacity disk drive in which the recorded data are totally timing independent and relatively pattern insensitive.

Another object of the present invention is to provide a fine adjustment transducer positioning mechanism which utilizes data recorded on the top and bottom of a disk stack on a once per revolution basis to obtain an accurate and reliable positioning of the transducer over the centerline of the track.

A still further object of the present invention is to provide a transducer positioning mechanism in which, if the servo information should be over-written, erased or degraded in any way, the data storage disks may be erased and the data bursts used to produce the servo information rewritten using a secondary position transducer (for example, an optical grating used to coarsely position the transducer) as a reference.

Another object of the present invention is to provide a transducer positioning mechanism in which regeneration of the the servo positioning data can be achieved without opening the disk drive unit itself.

Still another object of the present invention is to provide a transducer positioning mechanism which may be easily utilized with either linear or rotary voice coil actuators, with a secondary position transducer and two stepper motor drives which position directly to a track and may be micro-stepped proportionately to the error signal developed from the recorded data bursts.

Briefly described, these and other objects of the present invention are achieved in a high capacity Winchester disk drive in which a secondary or coarse positioning transducer, such as an optical grating as disclosed in the Harrison et al patent described above, is used to allow positioning to nominal track center. A data masked segment on both the top and bottom disks is utilized to contain recorded position data. The position information is recorded as a burst of data on the top disk of the stack at radial positions one-half track displaced from each odd numbered track centerline and as a similar burst of data on the bottom disk at radial positions one-half track displaced from each even numbered track center line.

An error or fine positioning signal is generated from that recorded data by simultaneously reading the data using the appropriate top and bottom heads simultaneously during error position detection. During normal recording or reading, only one head will be selected at a time. The output from each head is then independently envelope detected and the resultant envelope amplitudes are subtracted to obtain the position error signal. The error or fine positioning signal will be zero when the heads are positioned over the centerline of either an odd or an even track.

As described above, the present invention is designed to be used in conjunction with a coarse positioning transducer, such as an optical grating, which will allow positioning to the nominal track center. On a once per revolution basis, the present invention will provide an error signal which may be used to produce a correction signal for the optical transducer output, and thus to move the transducer stack into position over the track centerline.

By using an appropriate algorithm, a correction factor may be generated for each track since a relationship can be developed which covers both the initial offset and thermal expansion effects for any track position. In addition, in order to provide further integrity, the recorded data bursts may be positioned at multiple points on the revolution of the disks, instead of at just one sector. While this provides additional position data, it is at the expense of creating more disk space where data may not be written.

PREFERRED EMBODIMENT OF THE INVENTION

Figure 1:
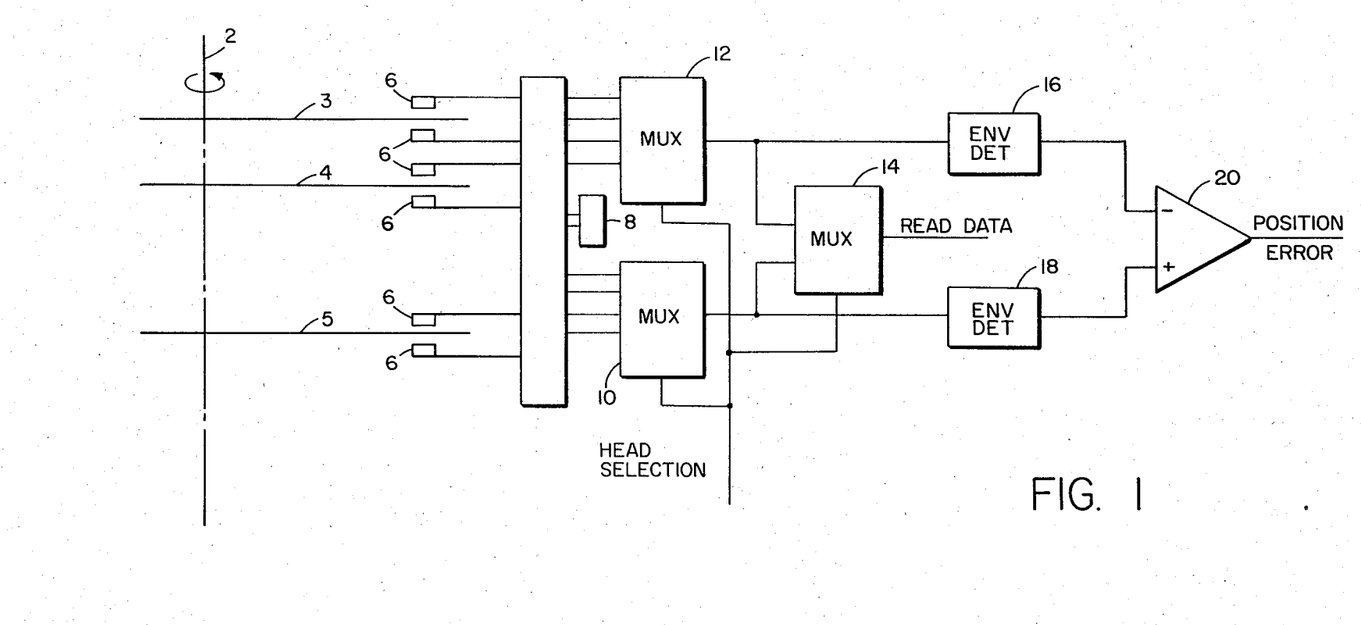
FIG. 1 schematically illustrates the production of a transducer head position error signal in accordance with one aspect of the present invention.

Referring now in detail to the drawings wherein like reference numerals are used to represent like parts throughout, there is shown in FIG. 1 a stack of magnetic recording disks 3–5 which are mounted for rotation on a central spindle 2. Data is read from and written to each of those recording disks 3–5 by the respective transducers or read/write heads 6. In this case, a transducer 6 is provided for both the top and bottom of each of the disks 3–5. All of the disks 3–5 are utilized for data storage, although only one surface of each of the top disk 3 and bottom disk 5 are configured with a sector having the data burst information utilized by the present invention to align the transducer 6 over the centerline of the addressed track. In the preferred embodiment, the top surface of the top disk 3 and the bottom surface of the bottom disk 5 contain such servo data information.

The data heads 6 are all ganged together for movement to and fro over the disk surfaces by actuator mechanism 8.

Figure 2:
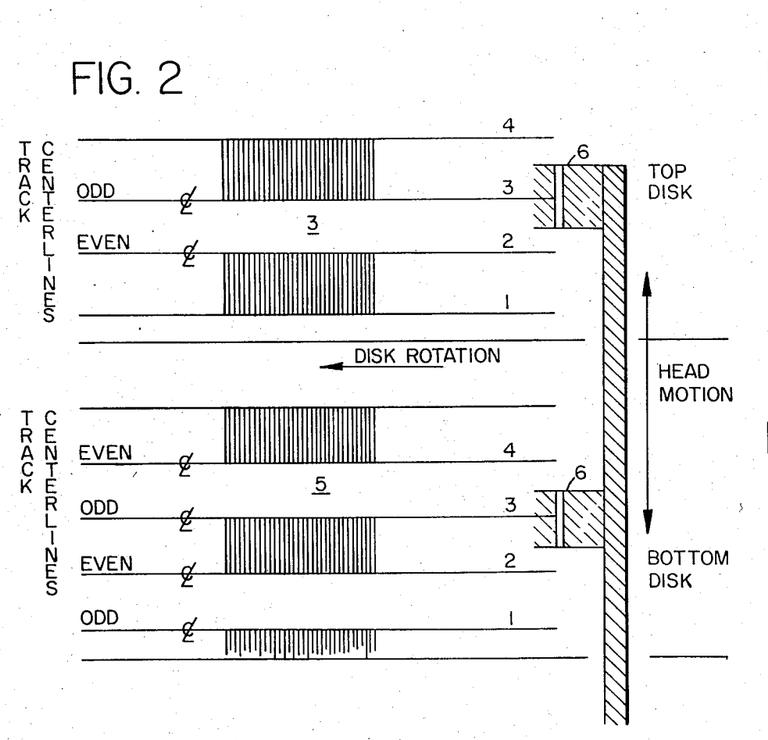
FIG. 2 is a schematic diagram illustrating the spacing of the data bursts about the track centerlines of the top and bottom disks utilized in one embodiment of the present invention.
Figure 3A:
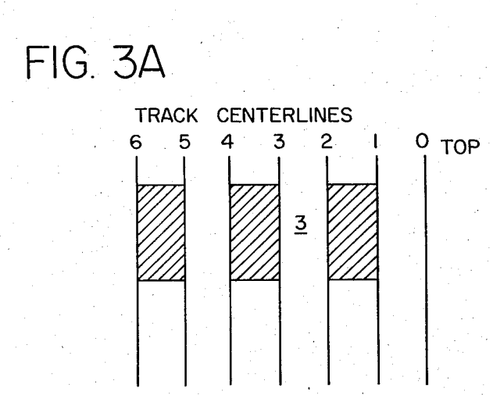
FIGS. 3A and 3B illustrate a graphic representation of the position of the data bursts about the track centerlines of the top and bottom disks used in the preferred embodiment of the present invention.
Figure 3B:
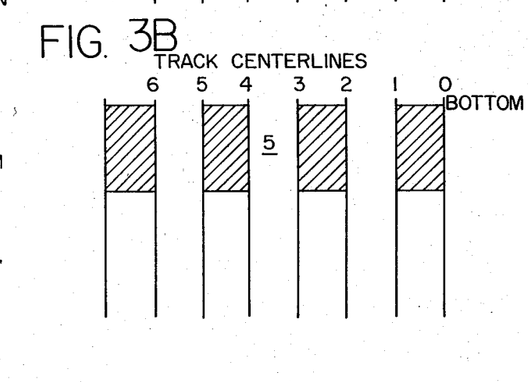

The position information is recorded as a burst of data on the top disk of the stack in a small segment thereof, that segment being about 100 microseconds long. As shown in FIGS. 2 and 3, the burst of data is recorded on the top disk of the stack at radial positions one-half track displaced from each odd-numbered track centerline, and is a track width wide. A similar burst of data is recorded on the bottom disk 5 at radial positions one-half track displaced from each even-numbered track centerline and is likewise one track width wide. It should be understood that the particular data recorded during the burst is not critical, however it should generally be a pattern minimally affected by head and/or disk variation. Apart from the segment of the top and bottom disk which is set aside for the encoded position data, as described above, the remaining surfaces of those disks and of both surfaces of any other disks that may be in the stack, are assumed to be totally erased. The segment is data-masked and may conveniently coincide in rotation with the index pulse of the disk drive. Means are provided to prevent the recording heads from writing in those segments.

The error signal is generated from the recorded data bursts by actuating the respective heads (in this instance head 6 on the top surface of the disk 3 and head 6 on the bottom surface of the bottom disk 5) simultaneously during error position detection, that is, at the time the heads are positioned over the segment of the disk on which the error signal data bursts are recorded. During normal recording, only one head is selected at a time.

The thus activated heads 6 read the data bursts contained on the disks 3 and 5. The data is transmitted through multiplexers 12 and 10 to individual envelope detectors 16 and 18. The outputs from the envelope detectors 16 and 18 are fed to a comparator 20 whose output corresponds to a position error signal. That error signal will be zero when the heads are positioned over either an odd or an even track centerline. However, in order to use that servo error signal, it must be inverted according to whether the heads are positioned over an even or an odd track.

As discussed hereinabove, the fine positioning method and apparatus of the present invention should be used in conjunction with a coarse position transducer, such as an optical grating, which will allow positioning of the heads 6 to the nominal trackcenter. Once per revolution, the present correction invention will provide an error signal which may be used to provide a correction factor for the optical transducer output such that the heads 6, if they are not initially aligned directly over the track centerline, will be moved to that track centerline. In addition, using an appropriate algorithm, an environmental correction factor may be generated for each track, as needed, since a relationship can be developed which covers the initial offset and thermal expansion effects for any track position.

The basic timing for the servo detection circuitry is established by the Hall-effect switches contained within the spindle motor. Those switches change state four times per revolution and therefore generate a 120 Hz signal. Thus, two rising and two falling edges are present per disk rotation. One of those edges is used to locate or establish an index. Either the rising or falling edges may be chosen and the ambiguity between the two occurrences of each per revolution is resolved as follows.

Upon the the unit being powered-up, the heads are moved to a zone which is data free except for a burst adjacent to the designated index edge. The envelope of that burst is detected and used to set the state of a divide-by-two counter, thus providing a 60 Hz signal in the correct phase. That technique is already used by the assignee of the present invention and is described more fully in U.S. Pat. No. 4,392,095. The edge chosen, which is synchronous with one of the Hall-effect transitions, is used to pre-condition the other timing signals used in index generation and servo recovery.

Figure 4:
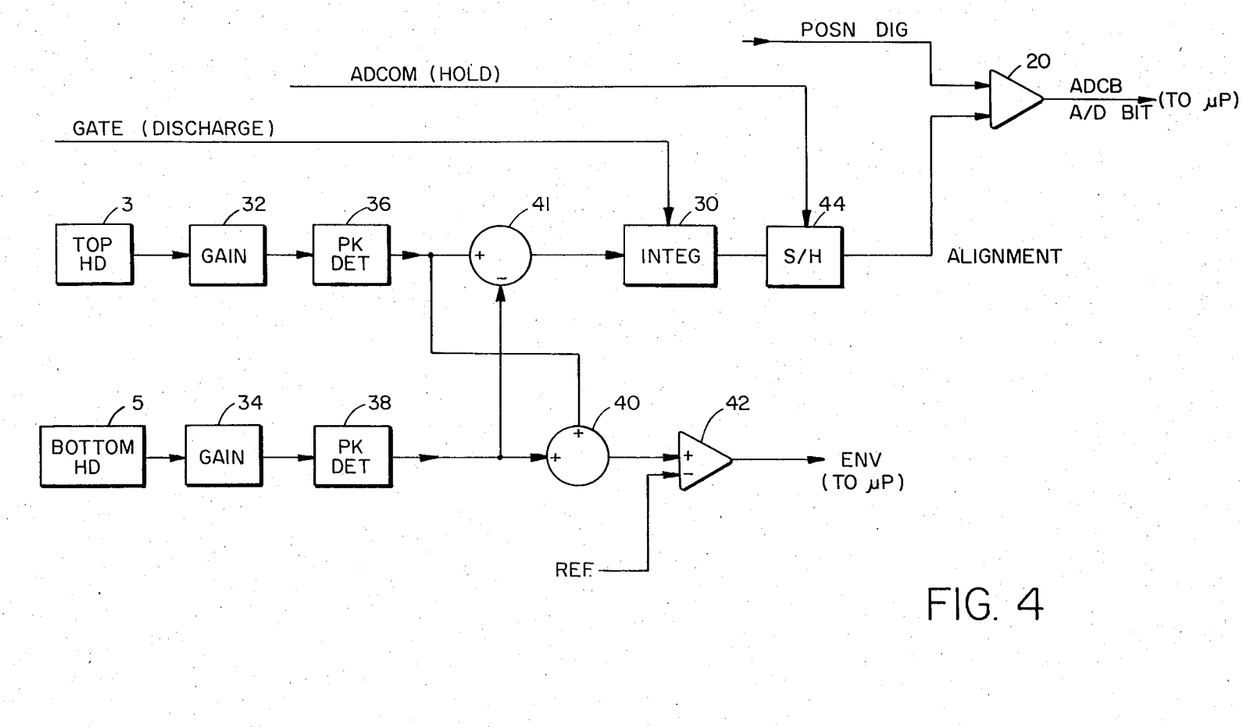
FIG. 4 is a functional block diagram of the fine tuning servo control circuitry of the present invention.

Referring now to FIG. 4, which shows the servo recovery or fine tuning circuitry and FIG. 5, which shows the timing of various signals utilized in positioning the heads of the disk drive, the operation of the instant disk drive will be described. As previously stated, and as shown in FIGS. 2, 3A and 3B, data bursts are written offset from each odd numbered track centerline on one disk of a disk stack and also are written offset from each even numbered track centerline on a different disk contained within the disk stack. The duration of such bursts is not critical. However, such bursts should be uniform in length and long enough such that noise effects are minimized, but not so long as to unduly decrease the available data space. It has been found that 100 microseconds, or less, is an adequate duration for such bursts.

The timing of each burst is such that its start is delayed from the appropriate Hall-effect edge. The delay is chosen, for example, to be equal to twice the anticipated worst case jitter and drift to be expected in detection of the Hall-effect edge, for example, 120 microseconds. That ensures a data free zone prior to detection of the servo bursts. It should be noted, that the appropriate disk surfaces should be erased, prior to writing servo bursts.

In normal operation of the disk drive, the servo bursts are processed as follows. Following a delay $t_1$ after detection of the Hall-effect edge, the GATE signal goes positive. While the GATE signal is positive, the drive is inhibited from writing on the disks, thus ensuring the integrity of the servo information.

The GATE signal is fed to an integrator 30 contained in the fine tuning servo circuit shown in FIG. 4. When the GATE signal becomes positive, it allows the integrator to charge in response to the difference in envelopes between the two data bursts as read from the disks. As shown in FIG. 4, the envelopes of the data bursts contained on the top disk 3 and the bottom disk 5 are detected by means of gain stages 32 and 34 and peak detectors 36 and 38. Their difference is generated in summing amplifier 41, whose output is fed to integrator 30.

The integration of that difference signal over a time predetermined by the burst length produces an alignment signal which is proportional to the difference in the envelopes of the two data bursts, as well as a signal having immunity from random noise effects. When the GATE signal is low, the integrator 30 is clamped at zero.

Figure 5:
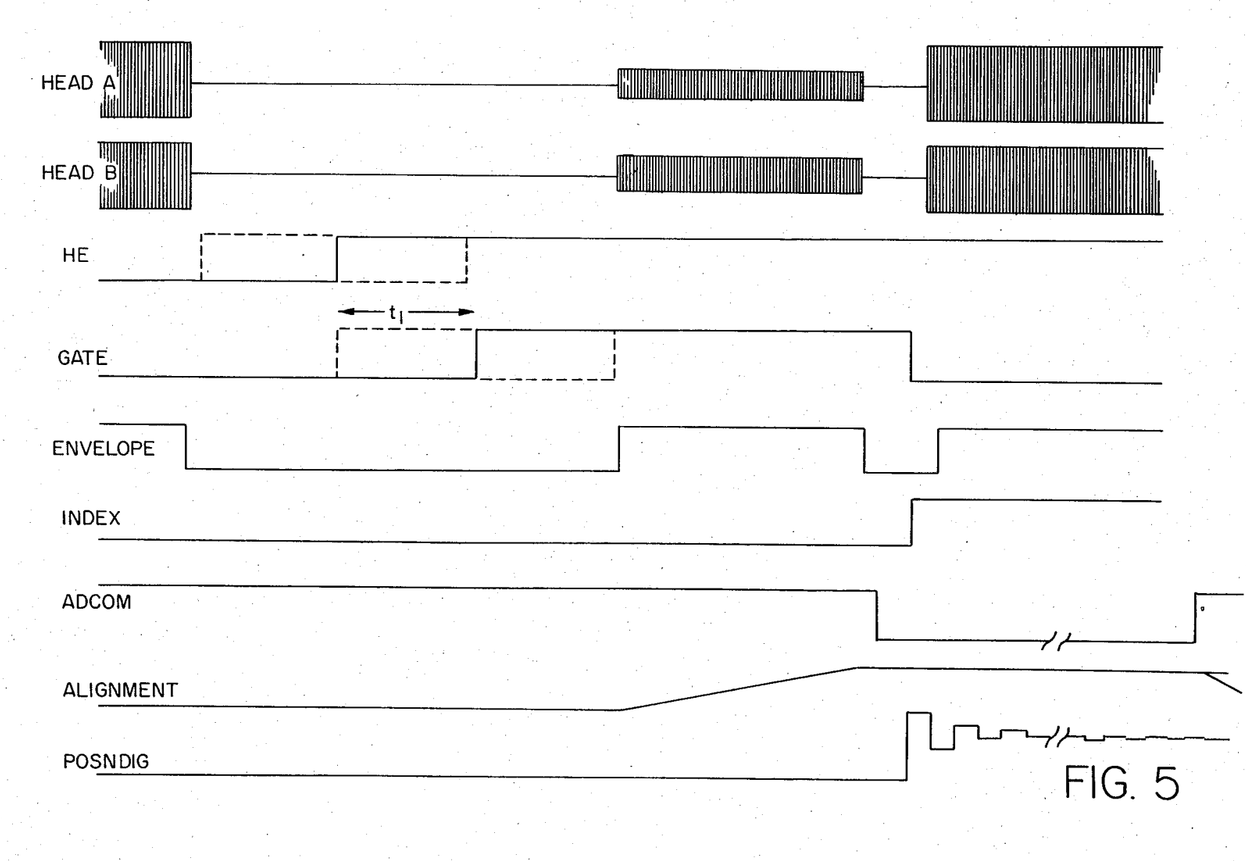
FIG. 5 is a diagram showing various signals present in the disk drive of the present invention.

As shown in FIG. 5, during at least a portion of the time the GATE signal is high, an ENVELOPE signal will also go high. The ENVELOPE signal is also generated by the fine tuning servo circuitry shown in FIG. 4. The two peak detected data burst signals are summed in amplifier 40 and then detected by comparator 42. A reference signal is applied to the negative terminal of the comparator 42 in order to allow the comparator to discriminate between the servo burst signal from summing amplifier 42 and noise. The output of the comparator 42 is the ENVELOPE signal.

Figure 6:
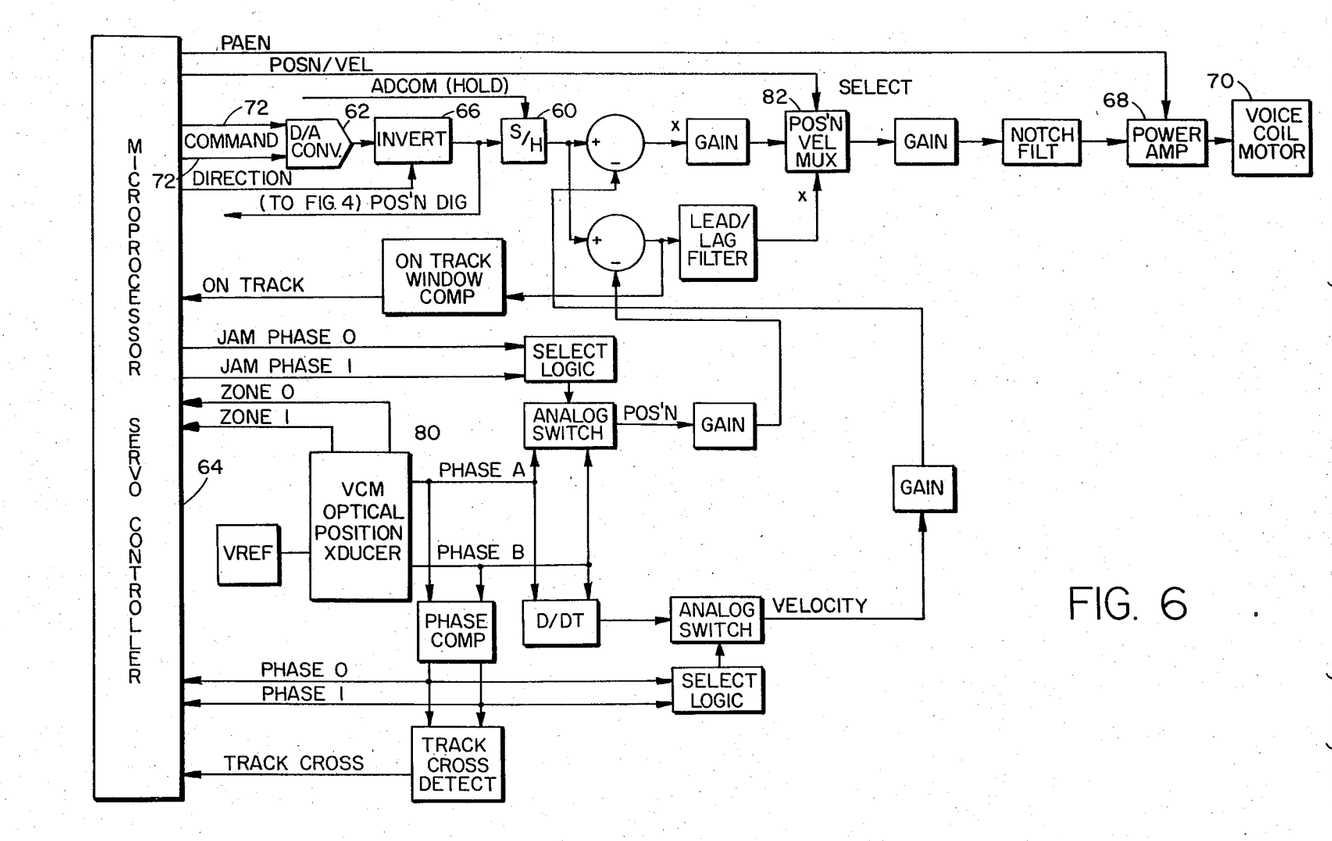
FIG. 6 is a functional block diagram of the overall servo control circuitry of the present invention.

At the end of the servo burst, the ENVELOPE signal goes low. The falling edge of the ENVELOPE signal causes the ADCOM signal to go negative. During the time the ADCOM signal is low, the sample and hold circuit 44 in the fine tuning servo circuit and the sample and hold circuit 60 in the servo circuit of FIG. 6 are switched to their hold mode.

The sample and hold circuit 60 maintains the position error signal applied to the servo as the last value determined by the digital-to-analog converter 62. That allows the D/A converter 62 to switch from its normal mode of setting servo demand without causing a glitch in the servo system. When the ADCOM signal is negative, the D/A converter 62 is controlled by the on-board microprocessor 64 to digitize the servo burst error signal.

The servo burst error signal is held in the sample and hold circuit 44 for the duration of the low level state of the ADCOM signal. Successive approximation values are fed to the D/A circuit 62 by the microprocessor 64 in order to generate the appropriate analog voltage POSNDIG. The signal from the microprocessor 64 is representative of a predetermined voltage. That voltage is compared with the servo burst error or ALIGNMENT signal in comparator 20 until a match is obtained. While the use of the sample and hold circuits 44 and 60 allows more time for the analog-to-digital conversion, the positioning system described herein may be constructed without using such sample and hold circuits.

A short time after the falling edge of the ENVELOPE signal, the GATE signal is terminated and an INDEX signal is initiated. That short time delay is to ensure the preservation of a data free zone following the servo burst signals. That time delay may be, for example, 60 microseconds. The INDEX signal is a pulse required by the ST506 interface and is of a duration specified for use with that interface. It should be noted that the INDEX signal is generated in synchronism with recorded data on the disk, and not in synchronism with the Hall-effect signal which is subject to drift. This method of generating the INDEX signal also provides an accurate reference point for mapping disk defects. That is a great improvement over prior art, low performance disk drives which generally produce their index signals directly from the Hall-effect signal and also over prior art high performance disk drives which have generally used complex decoding schemes to derive the index signal from particular recorded data patterns.

The digitized servo error burst signal for any radial head position is stored in the microprocessor of the disk drive and is used for fine correction as described hereafter.

On powering-up, the fine correction system is calibrated. The coarse positioning optical transducer is used to position the heads at $+X$ optical units from the optical track center. The magnitude of the servo burst error signal is then measured and stored. The coarse optical transducer is then used to position the heads at $-Y$ optical units from the track center and the servo burst error signal is again measured and stored. Thus, the relationship between optical disk placement and servo burst error may be determined. For a given track, that slope can be used to quickly calculate the true track center from a known optical offset and servo burst offset.

However, due to variations in head parameters and head outputs at different points on the disk surface, the relationship between optical transducer output and servo burst output must be calibrated at several radial positions. In the power-up sequence, the microprocessor measures and stores the optical offset required to null-out the servo burst error at several radial positions on the disk surface, as well as developing the slope information.

The slope information generally will not need to be recalibrated during drive operation since the parameters which define the slope are not temperature dependent. The track center, as defined by the servo burst, will, however, move radially as the head-disk assembly expands due to rising temperatures. The track center may also move in relationship to the coarse optical transducer signal.

It may therefore be necessary to recalibrate the servo system from time to time during drive operation. Such recalibration may be triggered in one of two ways. Recalibration may be performed on a time-related basis, generally more frequently on initial power-on. Or, it may be performed when an excessive error signal is detected from the servo burst. Since a correction signal is obtained once per revolution, that correction may be applied in real time to the track in question. When the error becomes excessive, it will be necessary to perform a general recalibration or to determine the required correction for the next track accessed before allowing reading or writing to that next track.

This technique is generally used in drives with simple device level interfaces, such as the ST506 interface, which has no provision for the drive to initiate actions independent of the drive controller. It is therefore necessary to "hide" any recalibration (after the initial power-on routine is completed) by incorporating the recalibration in the next seek initiated by the controller. Any such recalibrations should therefore be short enough in duration so that they do not violate any time-outs within the drive controller.

The operation of the servo itself in this regard utilizes well known principles. Transitions between tracks are determined by the drive controller issuing step pulses with a direction signal. The drive generates a seek equal in length to the number of step pulses. If those pulses are received at less than a certain frequency, the drive will proceed on a track-by-track basis, following the step pulses. If pulses are received at faster than a certain rate, the drive will move between tracks by controlling the velocity of head movement using an algorithm determined by the number of tracks to the destination. Step pulses are received within the microprocessor 64 and, since pulses arrive much faster than the drive can move between tracks, motion of the heads may be initiated before all step pulses are received.

Velocity feedback is obtained by differentiation of synchronously demodulated position signals from the optical transducer. When the microprocessor determines that the destination track has been reached, the drive is put in position servo mode, the appropriate position correction offset is applied and the drive is allowed to settle to the desired position.

In order to assist the actuator in overcoming friction, high amplitude, short duration pulses may be applied to the power amplifier 68 when the actuator has arrived at the destination track and is in the process of settling. Those pulses contain enough force to overcome friction but are of insufficient energy to drive the positioner to an incorrect location.

The servo loop itself is of generally conventional design with a notch filter to compensate for mechanical resonance and increased gain at low frequency to provide additional mechanical stiffness. The particular actuator 70 used in a preferred embodiment is of rotary voice coil construction but, the servo technique described herein is generally applicable to all types of actuators, microstepping stepper motors, torque motors and linear voice coils being just some of the applicable examples.

In operation, upon powering-up, the read/write heads are moved to an initial position over a partial track sector utilizing a coarse optical positioning mechanism known in the art and as shown in the bottom half of FIG. 6. When the head detects an index point, two heads are simulaneously enabled such that the data bursts previously discussed will be read from, for example, the top surfaces of the disks 3 and 5. The data burst signals read by the respective heads 6 are amplified by gain stages 32 and 34 and the envelopes of the respective burst signals are detected by peak detectors 36 and 38.

Each of the the peak detectors 36 and 38 feeds its output to summing amplifiers 40 and 41. The difference between the envelopes of the burst signals is determined in summing amplifier 41 and is then integrated in integrator 30, in accordance with the state of the GATE signal.

The output from integrator 30 is fed to a sample and hold circuit 44 which continues to sample and hold the output from the integrator 30 until the ADCOM signal goes negative. At that time, the sample and hold circuit is switched from its sample mode into the hold mode. In this manner, the sample and hold circuit 44 serves to produce at its output an ALIGNMENT signal equal to the highest value output from the integrator 30. As previously stated, at the end of the servo data burst signal, the ENVELOPE control signal goes negative which forces the ADCOM control signal to also go negative. The ENVELOPE signal is produced by comparing a reference value to the sum of the outputs from peak detectors 36 and 38, as summed in summing amplifier 40. The output from comparator 42 is the ENVELOPE control signal. It should be understood that the control signals ADCOM, GATE and ENVELOPE are fed to and/or generated by logic contained within the disk drive. Such logic may, for example, be implemented within a logic gate array integrated circuit.

The output from the sample and hold circuit 44 is fed to a comparator 20 for comparison to the POSNDIG signal which is generated as described hereinafter. The operation of comparator 20 is such that the output is 1 when ALIGNMENT, the output of sample and hold circuit 44 is greater than POSNDIG. The microprocessor digitizes ALIGNMENT as follows.

The microprocessor will output a particular value of POSNDIG by applying an appropriate value to D/A convertor 62 via the data bus 72 and will monitor the output of comparator 20. If POSNDIG is less than ALIGNMENT (comparator 20 output is 1) then a higher value of POSNDIG is applied until POSNDIG is greater than ALIGNMENT. This process is repeated using greater and smaller values of POSNDIG until a condition is reached where two values of POSNDIG are obtained, separated in value by one digital increment, such that the comparator output is 1 for one value and 0 for the other, indicating that the true value of ALIGNMENT lies between the two digital values.

Various algorithms are well known for performing this approximation in the most effective manner. When this state is reached, the microprocessor will store one or the other of the two values as the closest approximation of ALIGNMENT. As will be well known to those of ordinary skill in the art, the sample and hold circuit 44, the comparator 20, the D/A convertor 62 and the microprocessor are designed to digitize ALIGNMENT.

If the output from comparator 20 is a zero, meaning that the output from the sample and hold circuit 44 is not equal to the POSNDIG signal, then the microprocessor 64 generates another approximation signal which is converted to an analog signal by D/A convertor 62, inverted in invertor 66 and then is sent to comparator 20. In that manner, the microprocessor 64 supplies successive approximations to comparator 20 until the necessary error correction signal is equal to the error determined by the sample and hold circuit 44. As will be well known to those of ordinary skill in the art, the sample and hold circuit 44 is designed to digitize the ramp signal produced by the integrator 30.

The servo control circuitry shown in FIG. 6 is designed to operate in two different modes of operation, namely a velocity servo mode and a fixed position servo mode. Inasmuch as the operation of the circuitry of FIG. 6 is believed to be mostly conventional, only the differences over the prior art will be discussed further. The data bus 72 is used to operate the D/A converter 62 and inverter 66 in a muliplexed manner such that only one digital/analog convertor 62 is required to operate the servo circuitry and the error digitization circuitry, compared to the prior art servo circuits which generally utilize two D/A convertors, one for each task.

In conventional fashion, the microprocessor 64 generates, in accordance with the signals received from the optical position transducer 80 and associated circuitry shown on the lower half of FIG. 6, a voltage representing a demand velocity or position signal. Those signals, after processing, constitute the instructions to the voice coil motor 70 or other actuator for moving the head carrying structure 8. The POSN/VEL signal informs the position velocity multiplexer 82 whether to select the position or velocity mode, both position and velocity feedback being obtained from optical position transducer 80 and its associated differentiator circuits.

The microprocessor 64 transmits the demand signal via data bus 72 to the A/D convertor 62 which converts the signal to an analog voltage. When appropriate, the invertor 66 inverts that analog voltage (according to the desired direction of movement of the voice coil motor 70). The sample and hold circuit 60 samples the output of the invertor 66 and, when the ADCOM signal goes low, holds the sampled value.

During the time that the ADCOM signal is low, the microprocessor 64 inputs an approximation voltage on the data bus 72 to the D/A convertor 62. That digital voltage signal is converted to an analog signal and, if necessary, a sign is applied to that analog voltage signal by invertor 66 and it is then fed as the POSNDIG signal to comparator 20 in order to determine the magnitude and sign of the fine tuning servo error. Under such conditions, the sample and hold circuit 60 is effectively disconnected from the D/A convertor 62 and invertor 66 during the time the microprocessor 64 provides a series of voltage signals to produce the desired POSNDIG signal equal to the magnitude of the ALIGNMENT signal output from the sample and hold circuit 44.

The above-described closed loop head positioning mechanism allows the achievement of data storage on the disks at a density of approximately 925 tracks per inch using one-half height 5 and one-quarter inch disks in a so-called Winchester type disk arrangement. The data storage capacity of such a disk drive, which may utilize four disks, is an unformated 85 megabytes using a standard ST506 interface and MFM coding. However, utilizing 2,7 RLL coding and, for example, an SCSI interface, a capacity of 170 megabytes may be achieved.

The above-described technique allows the determination of the optical offset required on any track to center the recording heads over that track and thus to achieve a nominal zero error signal from the error burst data.

In operation of the disk drive, when a particular track is accessed, the microprocessor will output the required offset to center the heads on the servo burst as determined by the previously calculated offset criteria. Each track may have its own offset calculated from an algorithm using prior determined optical versus servo burst correlation. Alternatively, tracks may be grouped in adjacent bands and each track within the band given the same calculated offset. The specific implementation may be determined based upon a compromise between required correction accuracy, microprocessor storage capacity and available time for calculations.

As previously discussed, when the head is on track, an update of the servo burst error is obtained once per revolution, which may be used to update the stored correction data and the particular optical offset for that track.

If a failure occurs in the detection of any servo burst signals, the microprocessor will generate an index pulse a fixed delay time after the Hall-effect edge. Thus, the functionality of the drive is maintained even if the fine position correction signals are missing for any particular track.

As will be obvious to those of ordinary skill in the art, the invention as described herein may be implemented using both services of a single rotating hard disk, or any number of hard disks contained within a stack, as long as two separate recording surfaces are used, one each to contain the odd-numbered offset and even-numbered offset servo burst data.

Although only a preferred embodiment is specifically illustrated and described herein, it will be appreciated that many modifications and variations of the present invention are possible in light of the above teachings and within the purview of the appended claims within departing from the spirit and intended scope of the invention.

What is claimed is:

1. A fine position closed loop servo system for use in conjunction with a closed loop servo positioning system for a magnetic disk storage media having at least two data storage disks rotatingly driven at a constant velocity with a plurality of concentric data tracks on at least one of the surfaces of each of said data storage disks, at least one data transducer associated with and in close proximity to each of said data storage disks, said data transducers being mounted to a common head mounting structure for movement by driver means across said plurality of concentric tracks on each of said at least two data storage disks, comprising:
   first servo burst signals on a surface of a first of said at least two data storage disks, said first servo burst signals being recorded on said first data storage disk at radial positions one-half track displaced from one of the odd and even numbered concentric track centerlines;
   second servo burst signals on a surface of another of said at least two data storage disks, said second servo burst signals being recorded at radial positions one-half track displaced from the not already selected one of the odd and even numbered concentric track centerlines;
   means for simultaneously enabling the data transducers associated with the surfaces of said at least two data storage disks containing said first and second servo burst signals for reading said servo burst signals;
   means for simultaneously separately detecting the absolute value of the envelope of each of said first and second servo burst signals; and
   means for comparing each of said detected envelope signals in order to generate a position error signal for application to said driver means for promoting and maintaining track centerline alignment of an enabled data transducer during operation of said magnetic disk storage means.

2. A fine position closed loop servo control system for use in conjunction with a closed loop positioning system for a magnetic disk storage media having at least one data storage disk rotatingly driven at a constant velocity with a plurality of concentric data tracks on both surfaces thereof, at least one data transducer associated with and in close proximity to each of the surfaces of said data storage disk, said data transducers being mounted to a common head mounting structure for movement by driver means across said plurality of concentric tracks on said data storage disk, comprising:
   first servo burst signals on a first surface of said data storage disk, said first servo burst signals being recorded at radial positions one-half track displaced from one of the odd and even numbered concentric track centerlines;
   second servo burst signals on a second surface of said data storage disk, said second servo burst signals being recorded at radial positions one-half track displaced from the not already selected one of the odd and even numbered concentric track centerlines;
   means for simultaneously enabling the data transducers associated with the surfaces of said data storage disk containing said first and second servo burst signals for reading said servo burst signals;
   means for simultaneously separately detecting the absolute value of the envelope of each of said first and second servo burst signals; and
   means for comparing each of said detected envelope signals in order to generate a position error signal for application to said driver means for promoting and maintaining track centerline alignment of an enabled data transducer during operation of said magnetic disk storage means.

3. A fine position closed loop servo system for use in conjunction with a closed loop servo positioning system for a magnetic disk storage media having at least two data storage disks rotatingly driven at a constant velocity with a plurality of concentric data tracks on at least one of the surfaces of each of said data storage disks, at least one data transducer associated with and in close proximity to each of said data storage disks, said data transducers being mounted to a common head mounting structure for movement by driver means across said plurality of concentric tracks on each of said at least two data storage disks, comprising:
  first servo burst signals on a surface of a first of said at least two data storage disks, said first servo burst signals being recorded on said first data storage disk at radial positions one-half track displaced from one of the odd and even numbered concentric track centerlines;
  second servo burst signals on a surface of another of said at least two data storage disks, said second servo burst signals being recorded at radial positions one-half track displaced from the not already selected one of the odd and even numbered concentric track centerlines;
  means for simultaneously reading said first and second servo burst signals;
  means for processing the first and second servo burst signals read from said at least two storage disks to determine the peak value of each of said first and second servo burst signals; and
  means for sampling combined peak value signals of said first and second servo burst signals to produce a position error signal for application to said driver means for promoting and maintaining track centerline alignment of an enabled data transducer during operation of said magnetic disk storage means.

4. The system of claim 1, wherein said means for simultaneously separately detecting comprises a pair of peak detectors, each connected to receive only one of said first and second servo burst signals.

5. The system of claim 1, wherein said first and second servo burst signals are uniform in length and of a duration of 100 microseconds or less.

6. The system of claim 2, wherein said means for simultaneously separately detecting comprises a pair of peak detectors, each connected to receive only one of said first and second servo burst signals.

7. The system of claim 2, wherein said first and second servo burst signals are uniform in length and of a duration of 100 microseconds or less.

8. The system of claim 3, wherein said means for processing said first and second servo burst signals comprises a pair of peak detectors, each connected to receive only one of said first and second servo burst signals.

9. The system of claim 3, wherein said means for simultaneously separately detecting comprises a pair of peak detectors, each connected to receive only one of said first and second servo burst signals.

10. The system of claim 3, wherein said means for sampling combined peak value signals comprises:
  a pair of peak detector means each connected to receive only one of said first and second servo burst signals;
  a first summing means connected to said pair of peak detector means in order to produce a servo burst difference signal;
  means for digitizing said servo burst difference signal to produce an alignment signal; and
  means for comparing said alignment signal to predetermined generated reference signals to obtain a position error signal for application to said driver means.

11. The system of claim 10, wherein said means for digitizing comprises integrator means.

12. The system of claim 11, further including sample and hold means connected to said integrator means.

13. The system of claim 10, wherein computer means generates said reference signals until said generated reference signals equal said alignment signal.

14. The system of claim 10, wherein a single digital-to-analog convertor means is utilized by said system to generate both said reference signals for use by said means for comparing and instructions for use by said driver means.

15. The system of claim 14, further comprising means connected between said single digital-to-analog convertor means and said driver means for processing the analog signals generated by said single digital-to-analog convertor means for application to said driver means.

16. The system of claim 15, further comprising computer means connected to said single analog-to-digital convertor means for generating signals proportional to both coarse and fine positioning instructions for said driving means.

17. A method for the fine positioning of a closed loop servo system for use in conjunction with a closed loop servo positioning system for a magnetic disk storage media having at least two data storage disks rotatingly driven at a constant velocity with a plurality of concentric data tracks on at least one of the surfaces of each of said data storage disks, at least one data transducer associated with and in close proximity to each of said data storage disks, said data transducers being mounted to a common head mounting structure for movement by driver means across said plurality of concentric tracks on each of said at least two data storage disks, comprising the steps of:
  reading first servo burst signals on a surface of a first of said at least two data storage disks, said first servo burst signals being recorded on said first data storage disk at radial positions one-half track displaced from one of the odd and even numbered concentric track centerlines;
  reading second servo burst signals on a surface of another said at least two data storage disks, said second servo burst signals being recorded at radial positions one-half track displaced from the not already selected one of the odd and even numbered concentric track centerlines;
  simultaneously enabling the data transducers associated with the surfaces of said at least two data storage disks containing said first and second servo burst signals for reading said servo burst signals;
  simultaneously separately detecting the absolute value of the envelope of each of said first and second servo burst signals; and
  comparing each of said detected envelope signals in order to generate a position error signal for application to said driver means for promoting and maintaining track centerline alignment of an enabled data transducer during operation of said magnetic disk storage means.

18. The system of claim 1, further including means for inverting said position error signal prior to its application to said driver means if said enabled data transducer is centering on an even track.

19. The system of claim 1, wherein said error position signal functions to cause said driver means to move said enabled data transducer towards the center of the disk if said enabled data transducer is centering on an even track.

20. The system of claim 1, further including means for inverting said position error signal prior to its application to said driver means if said enabled data transducer is centering on an odd track.

* * * * *